US011972280B2

(12) United States Patent
Chatterjee et al.

(10) Patent No.: US 11,972,280 B2
(45) Date of Patent: Apr. 30, 2024

(54) GRAPHICAL USER INTERFACE FOR CONVERSATIONAL TASK COMPLETION

(71) Applicant: Intuit Inc., Mountain View, CA (US)

(72) Inventors: Shreeshankar Chatterjee, San Ramon, CA (US); Cynthia Joann Osmon, Sunnyvale, CA (US); Daniel Moise, Edmonton (CA); Tracy Fung, Fremont, CA (US); Vijay Thomas, Mountain View, CA (US); Jason Michael Webb, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/588,183

(22) Filed: Jan. 28, 2022

(65) Prior Publication Data

US 2023/0244511 A1 Aug. 3, 2023

(51) Int. Cl.
*G06F 9/451* (2018.01)
*G06N 5/02* (2023.01)

(52) U.S. Cl.
CPC ............... *G06F 9/453* (2018.02); *G06N 5/02* (2013.01)

(58) Field of Classification Search
CPC .......... G06F 9/453; G06N 5/02; G06N 5/022; G06N 5/025; H04L 51/02
USPC .................................................. 715/705, 709
See application file for complete search history.

(56) References Cited

U.S. PATENT DOCUMENTS

| | | | | |
|---|---|---|---|---|
| 9,600,769 | B1 * | 3/2017 | Liu | H04L 51/02 |
| 10,373,267 | B2 * | 8/2019 | Chang | G06Q 40/12 |
| 10,748,157 | B1 * | 8/2020 | Indyk | G06Q 30/016 |
| 10,762,299 | B1 * | 9/2020 | Parastatidis | G10L 15/22 |
| 10,943,072 | B1 * | 3/2021 | Jaganmohan | G06N 5/041 |
| 2014/0115456 | A1 * | 4/2014 | White | G10L 15/22 715/708 |
| 2015/0120389 | A1 * | 4/2015 | Zhang | G06Q 10/10 705/7.32 |
| 2017/0286132 | A1 * | 10/2017 | Fulton | G06F 3/167 |
| 2018/0247321 | A1 * | 8/2018 | Crabtree | G06Q 30/0242 |
| 2019/0005163 | A1 * | 1/2019 | Farrell | G06F 40/30 |
| 2019/0042988 | A1 * | 2/2019 | Brown | G06N 5/022 |
| 2019/0163500 | A1 * | 5/2019 | Daianu | G06N 20/20 |
| 2020/0050678 | A1 * | 2/2020 | McNeela | G06F 16/285 |
| 2020/0134019 | A1 * | 4/2020 | Podgorny | G06N 3/044 |
| 2020/0142719 | A1 * | 5/2020 | Akbulut | G06F 16/3329 |
| 2020/0341970 | A1 * | 10/2020 | Rodrigues | G06F 16/219 |
| 2020/0342175 | A1 * | 10/2020 | Gadde | G06F 40/30 |
| 2020/0372019 | A1 * | 11/2020 | Tokarev Sela | G06F 16/2425 |
| 2021/0073474 | A1 * | 3/2021 | Sengupta | H04L 51/02 |
| 2021/0118442 | A1 * | 4/2021 | Poddar | G06V 40/174 |
| 2021/0382925 | A1 * | 12/2021 | Fincun | G06F 40/35 |
| 2023/0064194 | A1 * | 3/2023 | Kwon | G06F 16/1734 |

* cited by examiner

*Primary Examiner* — Patrick F Riegler
(74) *Attorney, Agent, or Firm* — FERGUSON BRASWELL FRASER KUBASTA PC

(57) ABSTRACT

A method includes obtaining a help file including steps for a task and generating a knowledge graph including instructions corresponding to the steps. The method further includes extracting, from a user input of a user, an intent to complete the task. Responsive to extracting the intent to complete the task, obtaining the knowledge graph is obtained. Using the knowledge graph, an instruction of the knowledge graph is presented to perform an action in a workflow to complete the task.

20 Claims, 8 Drawing Sheets

Help File 400

Steps 402

404

```
"steps": [
    {
        "location": "/login",
        "action": "type",
        "target": "User ID",
        "targetSelector": "input[id=\"ius-userid\"]",
        "pageUrl": "https://c11.qbo.intuit.com/qbo11/login?webredir",
        "screenshotNumber": 4
    },
    {
        "location": "/login",
        "action": "type",
        "target": "Password",
        "targetSelector": "input[id=\"ius-password\"]",
        "pageUrl": "https://c11.qbo.intuit.com/qbo11/login?webredir",
        "screenshotNumber": 7
    },
    {
        "location": "/login",
        "action": "click",
        "target": "Sign in",
        "targetSelector": "span[id=\"ius-sign-in-submit-btn-text\"]",
        "pageUrl": "https://c11.qbo.intuit.com/qbo11/login?webredir",
        "screenshotNumber": 9
    },
    {
        "location": "/app/homepage",
        "action": "click",
        "target": "Settings",
        "targetSelector": "[data-id=\"settings\"]",
        "pageUrl": "https://c11.qbo.intuit.com/app/homepage",
        "screenshotNumber": 11
    },
    {
        "location": "/app/homepage",
        "action": "click",
        "target": "Manage users",
        "targetSelector": "[data-id=\"usermgt\"]",
        "pageUrl": "https://c11.qbo.intuit.com/app/homepage",
        "screenshotNumber": 13
    },
    {
        "location": "/app/usermgt",
        "action": "click",
        "target": "Add user",
        "targetSelector": "[data-automation-id=\"usermgt_add_user\"]",
        "pageUrl": "https://c11.qbo.intuit.com/app/usermgt",
        "screenshotNumber": 15
    },
```

FIG. 4A

Knowledge Graph 420A

| | ceStepId | ceTitle | ceSubTitle | ceNluText | ceRelevance | location |
|---|---|---|---|---|---|---|
| 0 | step1 | On Page: login. Please type on User ID text box | Are you done ? | On Page: login. Please type on User ID text box | 0 | /login |
| 1 | step2 | On Page: login. Please type on Password text box | Are you done ? | On Page: login. Please type on Password text box | 0 | /login |
| 2 | step3 | On Page: login. Please click on Sign in button... | Are you done ? | On Page: login. Please click on Sign in button... | 0 | /login |
| 3 | step4 | On Page: homepage. Please click on Settings bu... | Are you done ? | On Page: homepage. Please click on Settings bu... | 1 | /app/homepage |
| 4 | step5 | On Page: homepage. Please click on Manage user... | Are you done ? | On Page: homepage. Please click on Manage user... | 1 | /app/homepage |
| 5 | step6 | On Page: usermgt. Please click on Add user but... | Are you done ? | On Page: usermgt. Please click on Add user but... | 1 | /app/usermgt |
| 6 | step7 | On Page: usermgt. Please click on Time trackin... | Are you done ? | On Page: usermgt. Please click on Time trackin... | 1 | /app/usermgt |
| 7 | step8 | On Page: usermgt. Please click on Next button... | Are you done ? | On Page: usermgt. Please click on Next button... | 1 | /app/usermgt |
| 8 | step9 | On Page: usermgt. Please click on Select employ... | Are you done ? | On Page: usermgt. Please click on Select employ... | 1 | /app/usermgt |
| 9 | step10 | On Page: usermgt. Please click on Time trackin... | Are you done ? | On Page: usermgt. Please click on Time trackin... | 1 | /app/usermgt |
| 10 | step11 | On Page: usermgt. Please click on Next button... | Are you done ? | On Page: usermgt. Please click on Next button... | 1 | /app/usermgt |
| 11 | step12 | On Page: usermgt. Please type on First name te... | Are you done ? | On Page: usermgt. Please type on First name te... | 1 | /app/usermgt |
| 12 | step13 | On Page: usermgt. Please click on Last name tex... | Are you done ? | On Page: usermgt. Please click on Last name tex... | 1 | /app/usermgt |
| 13 | step14 | On Page: usermgt. Please click on Email text box | Are you done ? | On Page: usermgt. Please click on Email text box | 1 | /app/usermgt |
| 14 | step15 | On Page: usermgt. Please click on Save button... | Are you done ? | On Page: usermgt. Please click on Save button... | 1 | /app/usermgt |

Knowledge Graph 420B

From FIG. 4B

| action | target | targetSelector | pageUrl | screenshotNumber |
|---|---|---|---|---|
| type | User ID | input[id="ius-userid"] | https://c11.qbo.intuit.com/qbo11/login?webredir | 4 |
| type | Password | input[id="ius-password"] | https://c11.qbo.intuit.com/qbo11/login?webredir | 7 |
| click | Sign in | span[id="ius-sign-in-submit-btn-text"] | https://c11.qbo.intuit.com/qbo11/login?webredir | 9 |
| click | Settings | [data-id="settings"] | https://c11.qbo.intuit.com/app/homepage | 11 |
| click | Manage users | [data-id="usermgt"] | https://c11.qbo.intuit.com/app/homepage | 13 |
| click | Add user | [data-automation-id="usermgt_add_user"] | https://c11.qbo.intuit.com/app/usermgt | 15 |
| click | Time tracking only | [data-automation-id="usermgt_add_trowser_user"... | https://c11.qbo.intuit.com/app/usermgt | 17 |
| click | Next | [data-automation-id="usermgt_add_btn_next"] | https://c11.qbo.intuit.com/app/usermgt | 19 |
| type | Select employee or vendor | [data-automation-id="select_type_ahead_text_fi... | https://c11.qbo.intuit.com/app/usermgt | 22 |
| click | Time tracking settings | [data-automation-id="usermgt_add_step3_title"] | https://c11.qbo.intuit.com/app/usermgt | 24 |
| click | Next | [data-automation-id="usermgt_add_btn_next"] | https://c11.qbo.intuit.com/app/usermgt | 26 |
| type | First name | [data-automation-id="usermgt_add_firstName"] | https://c11.qbo.intuit.com/app/usermgt | 29 |
| type | Last name | [data-automation-id="usermgt_add_lastName"] | https://c11.qbo.intuit.com/app/usermgt | 32 |
| type | Email | [data-automation-id="usermgt_add_email"] | https://c11.qbo.intuit.com/app/usermgt | 35 |
| click | Save | [data-automation-id="usermgt_add_btn_next"] | https://c11.qbo.intuit.com/app/usermgt | 37 |

GRAPHICAL USER INTERFACE FOR CONVERSATIONAL TASK COMPLETION

CROSS-REFERENCE TO RELATED APPLICATIONS

This application is related to U.S. patent application Ser. No. 17/588,175, filed concurrently herewith, entitled "GENERATION OF CONVERSATIONAL TASK COMPLETION STRUCTURE," having the same inventors, and incorporated herein by reference.

BACKGROUND

Software applications, such as web applications and local applications, have instructions to help users to perform a variety of tasks. The instructions include the display of various graphical user interface (GUI) elements, such as menus, buttons, popups, and other components configured to receive input from a user and display output. The arrangement of the various GUI elements is the design of the GUI. The ideal GUI is intuitive, such that users can easily navigate the application to perform various tasks.

Occasionally, users have difficulty in performing certain tasks. In such a scenario, the user may access a help file for the software application. The help file may display an entire static list of to the user a single static list of steps for performing the task. The user then attempts to perform the task by performing each step in the static list.

SUMMARY

In general, in one aspect, one or more embodiments relate to a method that includes obtaining a help file including steps for a task and generating a knowledge graph including instructions corresponding to the steps. The method further includes extracting, from a user input of a user, an intent to complete the task. Responsive to extracting the intent to complete the task, obtaining the knowledge graph is obtained. Using the knowledge graph, an instruction of the knowledge graph is presented to perform an action in a workflow to complete the task.

In general, in one aspect, one or more embodiments relate to a system that includes a repository, a computer processor, a knowledge graph generator, and a task completion manager. The repository is configured to store a first help file steps for a task, and a knowledge graph that includes instructions corresponding to the steps. The knowledge graph generator executes on the computer processor and is configured to generate the knowledge graph from the help file. The task completion manager executes on the computer processor and is configured to extract, from a user input of a user, an intent to complete the task, responsive to extracting the intent to complete the task, obtain the knowledge graph, and present, using the knowledge graph, an instruction to perform a action in a workflow to complete the task.

In general, in one aspect, one or more embodiments relate to a non-transitory computer readable medium comprising computer readable program code to perform operations. The operations include obtaining a help file including steps for a task and generating a knowledge graph including instructions corresponding to the steps. The operations further include extracting, from a user input of a user, an intent to complete the task. Responsive to extracting the intent to complete the task, obtaining the knowledge graph is obtained. Using the knowledge graph, an instruction of the knowledge graph is presented to perform an action in a workflow to complete the task.

Other aspects of the invention will be apparent from the following description and the appended claims.

BRIEF DESCRIPTION OF DRAWINGS

FIGS. 4A, 4B, 4C, and 4D show an example in accordance with one or more embodiments.

DETAILED DESCRIPTION

Figure 1:
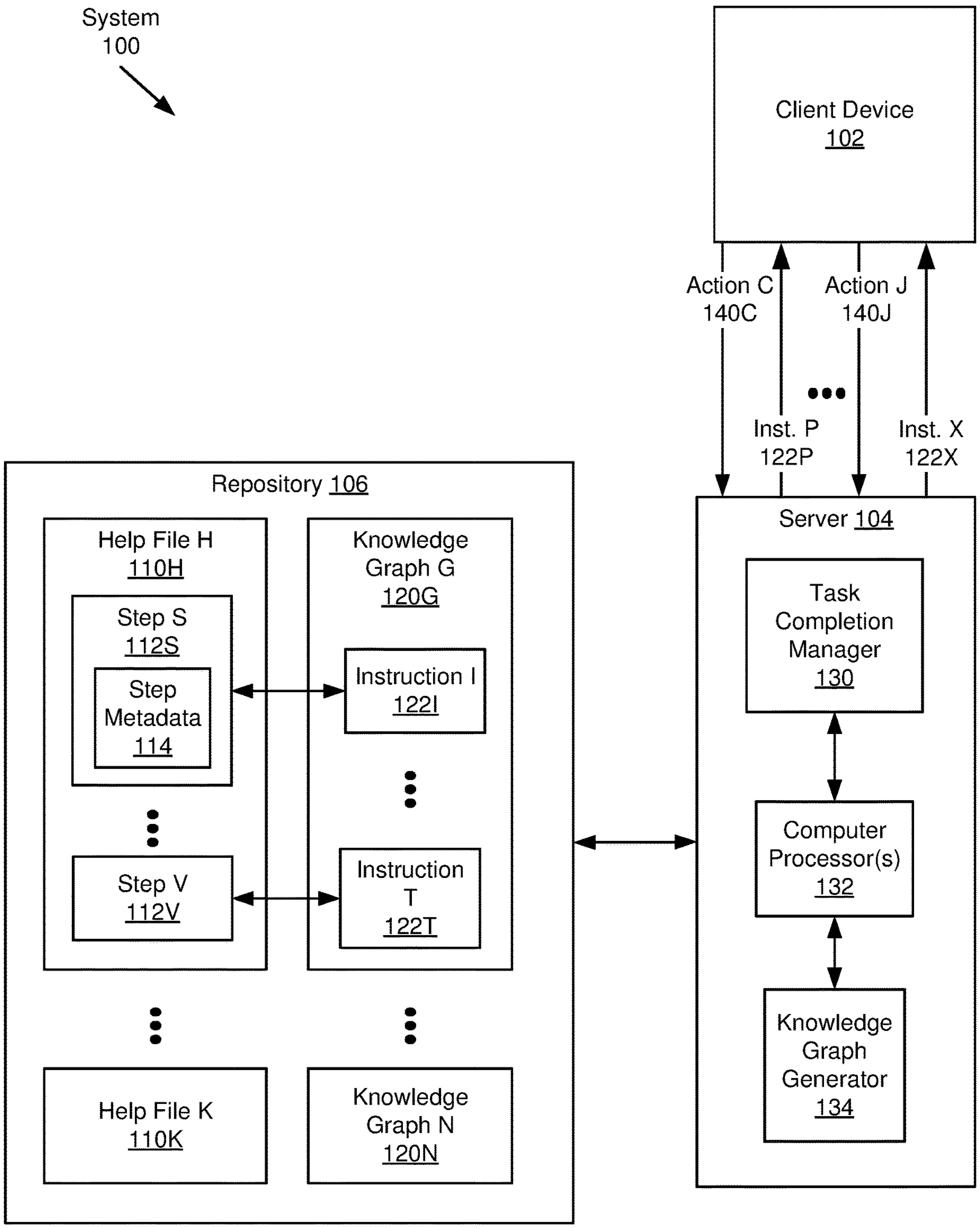
FIG. 1 shows a diagram of a system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a graphical user interface (GUI) that transforms the way in which users receive help to perform various tasks. In particular, a knowledge graph is defined for a particular task. The knowledge graph is a graph of user level instructions, whereby each instruction presents, in a natural language, a step to the user. In the knowledge graph, each instruction is a single node of the graph and an edge leads to a next node based on success or failure of performing the step. The presentation of the instructions in the knowledge graph is interactive in that the user is presented with the next step only after completion of the prior step. In one or more embodiments, each knowledge graph is related to a task. One or more embodiments disambiguate the user's intent from other intents to perform other tasks and then interactively help the user through the step by step instructions of the knowledge graph.

FIG. 1 shows a diagram of a system (100) in accordance with one or more embodiments. As shown in FIG. 1, the system (100) includes a repository (106), a server (104), and a client device (102). The client device (102) and server (104) may each correspond to the computing system shown in FIGS. 5A and 5B. The repository (106) is any type of storage unit and/or device (e.g., a file system, database, collection of tables, or any other storage mechanism) for storing data. Further, the repository (106) may include multiple different storage units and/or devices. The multiple different storage units and/or devices may or may not be of the same type or located at the same physical site.

The repository (106) includes functionality to store help files (e.g., help file H (110H), help file K (110K)) and knowledge graphs (e.g., knowledge graph G (120G), knowledge graph N (120N)). A help file (e.g., help file H (110H), help file K (110K)) is a file storing a help document. The help document may be a structured or unstructured document that defines a series of steps (e.g., Step S (112S), Step V (112V)) that a user can take to perform a particular task. In one or more embodiments, the help document is specific to a particular task. The task corresponds to goal that the user would like to achieve with the software application. For example, the task may be the generation of a particular type of report, setting a preference in the GUI of the software application, adjusting an account or account setting, storing a data, etc. The software application enables the performance of the task through multiple steps. The same task may be performed using multiple different sets of steps.

Steps in the help file are encoded using computer language rather than natural language. While a human may be able to read the step, the step is not presented as a series of words or phrases, but rather as a set of identifiers. In one or more embodiments, each step in the set of steps include step metadata (114). The step metadata includes attributes that include an identifier of an action to perform, and identifiers of the parameters to use when performing on the action. For example, the action may be identify that the user should click, one parameter may be a uniform resource locator (URL) of the current webpage, another parameter may identify the target GUI widget for performing the action by the computer based identifier of the widget. In one or more embodiments, the step metadata (114) is stored as step attribute value pairs in the help file. Attribute value pairs include an attribute type and attribute value for each attribute. For example, the step metadata (114) may be stored in JavaScript Object Notation (JSON) file format. Other formats may be used without departing from the scope of the invention.

In one or more embodiments, the help files are generated through automated techniques. For example, the help file may be a clickstream file. The clickstream file is a recording of the series of steps that a user performs using a software application. A teaching user may demonstrate how to perform a task by starting a clickstream recording. The recording records, without further user input into the recording, the step metadata for each step that the teaching user performs in the software application as the user performs the steps. The result of the recording may be the help file.

Continuing with FIG. 1, a knowledge graph (e.g., knowledge graph G (120G), knowledge graph N (120N)) is a directed acyclic graphical storage structure having nodes that are connected by edges. The nodes store instructions (e.g., instruction I (122I), instruction T (122T)). Each instruction is a natural language instruction. For example, the natural language instruction may be a complete sentence or instructional phrase in the natural language format. Thus, whereas the step in the help file is in a computer encoded format, the instruction is in a human readable format. In addition to a natural language instruction, the node may also include context metadata. Context metadata includes contextual information about the instruction. For example, the context metadata may include a relevance to a current task and a output state identifier of an output state that triggers following an edge to the next node. The output state may be success or failure indicators of performing the instruction. As another example, the output state may be the state of storage, the GUI of the software application, or another part of the software application at the end of the performing the step. For example, the output state may be that a popup menu is displayed or that a value is successfully stored in storage.

The edges are directed from a parent node to one or more child nodes based on success or failure of completion of the instruction corresponding to the parent node. An edge may include an edge label identifying the state of the software application to follow the edge.

Multiple knowledge graphs may exist, whereby each knowledge graph corresponds to an individual task. A single knowledge graph may have multiple nodes that are designated as entrance points. An entrance point is the starting location for presenting instructions in the knowledge graph. The entrance point is may be based on the user's intent and the current state of the user's system. Thus, whereas the help file has a single starting location (i.e., the initial step in the help file), the knowledge graph may have multiple possible starting locations. The knowledge graph may have corresponding task metadata that uniquely identifies the task matching the knowledge graph and each entry point in the knowledge graph.

As shown in FIG. 1, the repository (106) is connected to a server (104), which is connected to a client device (102). The client device (102) is the device of the target user that is requesting help. Specifically, the target user accesses the help in the knowledge graph via the client device (102) and the server (104). The software application for which the user may be requesting the help may be an application that that user is accessing via the client device, such as by being a local application executing on the client device, a web application that the user accesses from a browser of the client device, or another type of application.

In one or more embodiments, the client device (102) is configured to receive instructions (e.g., instruction P (122P), instruction X (122X)) from the server (104) and transmit actions (e.g., action C (140C), action J (140J)) to the server (104). The instructions (e.g., instruction P (122P), instruction X (122X)) are the instructions (e.g., instruction I (122I), instruction T (122T)) of the knowledge graphs and are presented in the order of the knowledge graph. Thus, the instructions are the natural language instructions. Instructions may be presented in a help interface on the client device (102). The help interface may display the current instruction and optionally, one or more selectable GUI widgets for a user to indicate when and whether the action specified by the current instruction is complete.

The actions (e.g., action C (140C), action J (140J)) are actions in the software application or an action requesting to move to the next instruction in the knowledge graph. For example, the action may be the selection of a particular widget in the software application that is identified in the instruction. As another example, the action may be the selection of the selectable GUI widget in the help interface.

The server (104) includes one or more computer processors (132) that are configured to execute a task completion manager (130) and a knowledge graph generator (134). The task completion manager (130) is configured to interact with the user, identify the user's intent from a user's query, select a knowledge graph and an entrance point in the knowledge graph, and transmit instructions to the client device (102), and receive actions. In one or more embodiments, the task completion manager (130) includes a classifier that is configured to classify a user input to extract a user intent. The user input may include a query and state information of the software application. The classifier may be a recurrent neural network, such as an encoder decoder model, that is configured to classify the user input into one or multiple predefined intents to complete different tasks. The conversational task manager may also include a mapping register that maps user intent to the task metadata that identifies the entrance point in the knowledge graph.

The knowledge graph generator (134) is configured to generate knowledge graphs from help files. The knowledge graph generator (134) may include an action listener that listens for new help files, a jobs engine that manages the generation of a knowledge graph from the new help file, and a natural language processor that generates natural language instructions from each step. In one or more embodiments, the natural language processor is connected to a set of natural language templates. The natural language template may map to different actions and other attribute types of the steps. The natural language template may include natural language text and one or more predefined locations for particular step attributes. Each of the predefined locations may be related to an attribute type identifier in the template.

The system of FIG. 1 is configured to generate knowledge graphs from help files and to present the knowledge graphs to client devices. While FIG. 1 shows a configuration of components, other configurations may be used without departing from the scope of the invention. For example, various components may be combined to create a single component. As another example, the functionality performed by a single component may be performed by two or more components.

Figure 2:
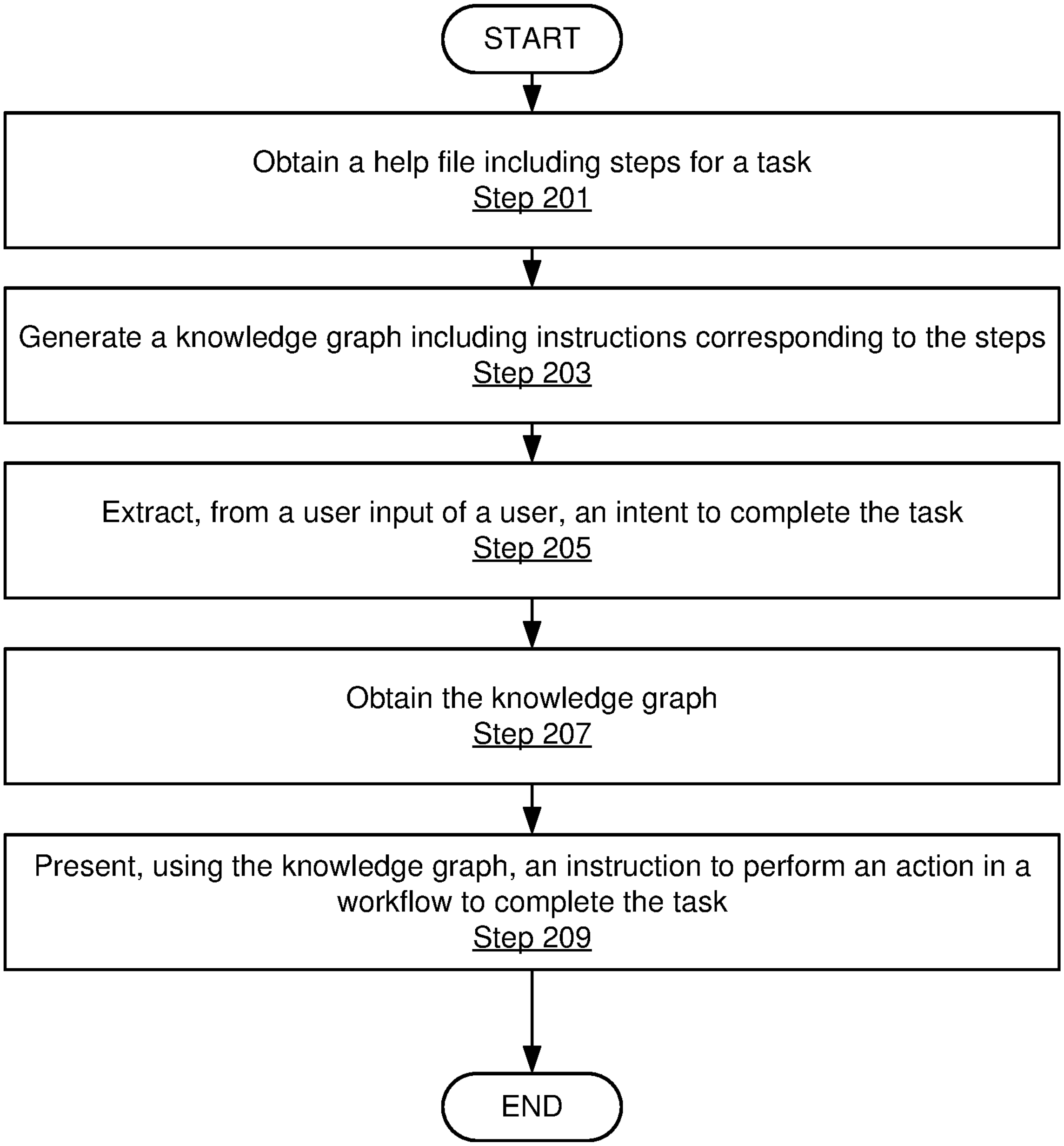
FIG. 2 shows a flowchart from a server perspective in accordance with one or more embodiments.

FIG. 2 shows a flowchart from a server perspective in accordance with one or more embodiments. In Step 201, a help file including steps for a task is obtained. For example, a teaching user may trigger the generation of the help file by initiating recording. The teaching user may optionally provide task metadata for the help file. Additional task metadata may be gathered from state information of the teaching user's system. For example, the server may collect version information of the software application that the teaching user is using, as well as other information. As discussed above, the help file may be clickstream information. In such a scenario, as the teaching user is using the software application, the software application stores clickstream data recording the step metadata for each step that the teaching user performs. The generation of the help file triggers a job for the knowledge graph generator, which obtains the help file from storage.

In Step 203, a knowledge graph including instructions corresponding to the steps is generated. For each step, the knowledge graph generator may extract the action identifier. Based on the action identifier, the knowledge graph generator may obtain the corresponding template for an instruction. The knowledge graph generator then adds the step attribute values to an instruction based on the template. The knowledge graph generator may also add, to the node for the instruction, context metadata from the step metadata and from current state information. For example, the knowledge graph generator may maintain a step count and add the current value of the step count as a step identifier to the node. Similarly, the knowledge graph generator may use add success or failure options to the node to allow the user to select whether to move to the next step. The knowledge graph generator uses the task metadata with the help file to generate task metadata for the knowledge graph and to generate a relevance value specifying a relevance of each step. The relevance may be based, for example, on a comparison of the current location in the software application to the overall task.

The knowledge graph is stored and associated with a runtime environment. In the runtime environment, the mapping register and classifier may be updated based on the new knowledge graph.

In some embodiments, the mapping register is updated to map task metadata identifying the task with the new knowledge graph. The task metadata may be added to the mapping register and associated with a task identifier. If the task identifier already exists in the mapping register indicating that a knowledge graph already exists for the task, then contextual information may be used to differentiate between knowledge graphs. For example, the contextual information may be the version of the software application, the type of data that the user has already stored, information about the type of user, etc.

In some embodiments, the classifier may be trained to recognize the user's intent to perform the task and, optionally, the knowledge graph to select. In one or more embodiments, the classifier is trained with prelabeled user input that is labeled with corresponding entrance points in the knowledge graph. For example, the classifier may be trained to recognize that queries starting with "How do I" indicate a request to complete a task as compared to user input that is just the name of a menu option (e.g., "format text") or user input that is a general knowledge question (e.g., "can I claim my home office as a tax deduction?"). In the case of menu option questions, the server may display the menu having the menu option. In the case of the general knowledge question, the server may direct the user to a general knowledge help interface. The classifier is further trained to recognize the intent of the user to perform a particular type of task. For example, "how do I create a new account?" and "How do I add a new user?" may refer to the same task of creating a new account for a new user.

In Step 205, from a user input of a user, an intent to complete a task is extracted. The user input may include a user query and contextual information. The contextual information may include a current workflow of the user, the name and version of the software application, a current location of the user in the software application, and other information. The user query and contextual information is processed through the classifier to obtain a user intent to complete a task.

In Step 207, a knowledge graph is obtained. Because a task is mapped to the knowledge graph, the knowledge graph may be determined based on the user's intent to complete the task. In some embodiments, the output of the classifier is a identifier of a particular knowledge graph and entrance point in the knowledge graph. In other embodiments, the intent to complete the task is used to identify one or more entries in the mapping register. For example, the task metadata in the mapping register of the entries corresponding to the task are compared against the contextual information of the user to select a particular entry. The knowledge graph mapped to the selected entry is obtained. Contextual information may be used to identify the entrance point within a knowledge graph. For example, if the user has completed a login to the software application, then nodes corresponding to logging in are excluded, and the entrance point for the node after logging in is selected as the entrance point.

In Step 209, using the knowledge graph, an instruction to perform an action in the workflow to complete the task is presented. The server sends the natural language instruction to the client device. The natural language instruction may include GUI widgets that allow the user to select to move to the next. In one or more embodiments, the natural language instruction is presented as a conversation user interface. Additionally, each node is presented one by one after the previous node is completed. Thus, the user is able to see the current step that the user is performing without being overwhelmed with other steps.

In order to move to the next step, an indication that a user has performed the action in the previous step or failed to perform the action in the previous step is received. In one or more embodiments, the user may use the GUI widgets to select to move to the next node or to indicate failure. As another example, the user performing the action may be the indication that causes the display of the next instruction. For example, the software application may send current state information with the action identifier to the task completion manager. The current state may indicate that the action is complete or incomplete (e.g., the state of the software application indicates that the user did not successfully complete the action). If the current state indicates success (e.g., the new location matches the location of the next node on a success path), then the task completion manager traverses to the next node in the knowledge graph by following the corresponding edge for success. If the current state is failure, then the task completion manager traverses to the next node by following the edge based on the current state.

Figure 3:
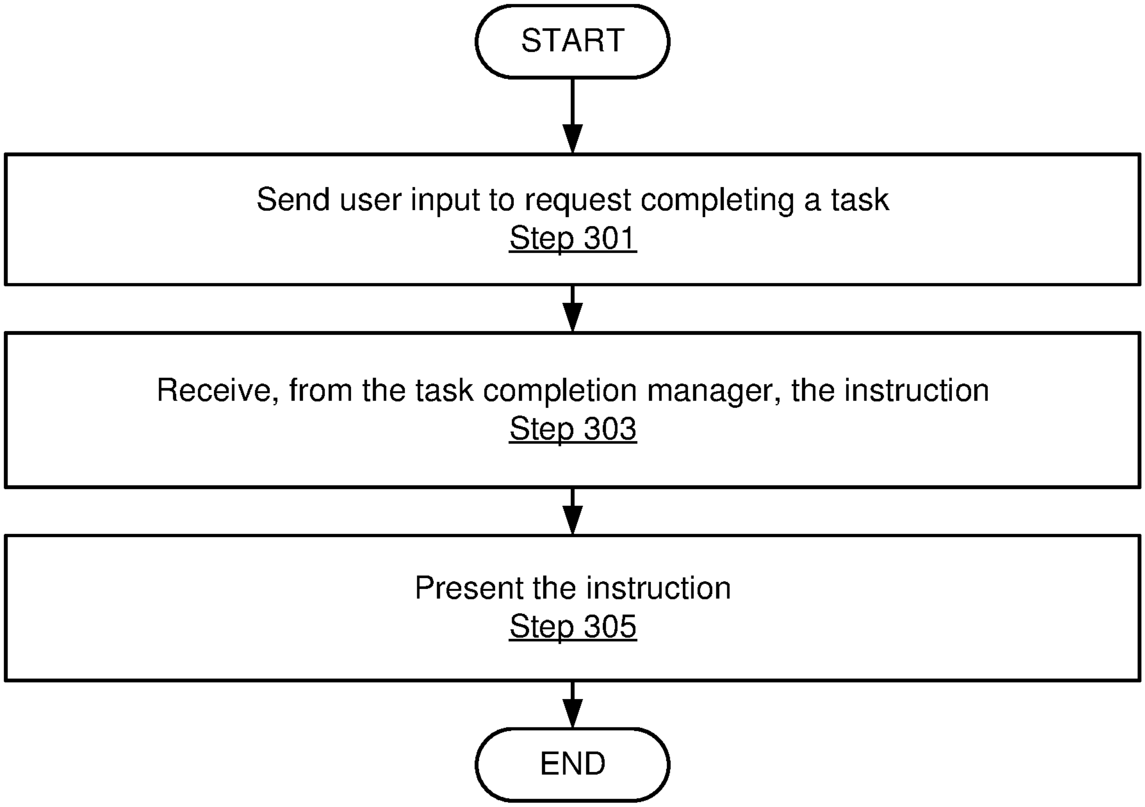
FIG. 3 shows a flowchart from a client perspective in accordance with one or more embodiments.

FIG. 3 shows a flowchart from a client perspective in accordance with one or more embodiments. In Step 301, a user input requesting to complete a task is sent. While using the software application, the user may have a task that the user would like to complete. The user may submit a user query in a help widget of the software application, a separate website, or a different location. The client device packages the user query with gathered state information to generate user input. In Step 303, the instruction is received from the task completion manager and presented in Step 305. The client device renders the instruction with GUI widgets so that the user may select to move to the next instruction. The underlying knowledge graph is hidden to the client device and user in one or more embodiments. Once the user has completed the action in the instruction, an indication that the user performed the action is transmitted back to the client device and the next instruction is presented. The indication may be the action identifier or a request to proceed to the next step. When the user has completed the last instruction along a path, a success or failure notification may be transmitted to the client device and displayed to the user.

FIGS. 4A, 4B, 4C and 4D show examples in accordance with one or more embodiments. The following examples are for explanatory purposes only and not intended to limit the scope of the invention.

Turning to FIG. 4A, FIG. 4A shows an example of a help file (400) in accordance with one or more embodiments. In the example, the help file is clickstream data and the software application is a web application, in which a training users actions were captured. The help file (402) stores the steps (402) in a JSON file format. Each step (e.g., step (404)) is denoted by a start and ending brace and is captured as clickstream data. Thus, the step has a location denoting a location in the web application, an action type of an action, a target denoting the name of the type of target UI widget that receives the action, a target selector denoting a unique identifier of the target UI widget that receives the action, a page uniform resource locator (URL) of the web page of the web application that receives the action, and a screenshot number that is incremented with each action that is captured.

As shown in the example FIG. 4A, the clickstream data does not present information in a way that an end user may easily identify how to perform the action. Although information is presented, it is in a computer encoded format rather than a natural language format.

Turning to FIGS. 4B and 4C, FIG. 4B and FIG. 4C show a knowledge graph (420) arranged as a list of rows. FIG. 4C is a continuation of each respective row shown in FIG. 4B. Each row shown in FIG. 4B and FIG. 4C corresponds to an individual node of the knowledge graph. The columns of FIG. 4B and FIG. 4C are as follows. The node identifier (421) identifies the node and the step identifier (422) is the name of the current step. Although FIG. 4B and FIG. 4C show a linear knowledge graph, if the knowledge graph has two distinct paths, then different nodes having different node identifiers may have the same step identifier. The next node in the knowledge graph for traversal based on node identifier, while the step identifier is presented to the end user. In the row form in FIG. 4B and FIG. 4C, multiple rows may have the same step identifier and different node identifiers. Different output states specify in the row may also be related to the next node identifier which identifies the next node for traversal.

Continuing with the discussion of the columns, the CeTitle (424) column shows title of the row. CeSubTitle (426) is the subtitle for the GUI widget for the user to select to move to the next instruction. ceNLUText (428) shows the natural language instruction that is presented for the row. ceRelevance (430) shows the relevance value to the particular task. The relevance task identifies how related the current instruction is to the particular task. If the step is deemed irrelevant, then the instruction is optionally presented. For example, the instruction is presented only if the action is determined to be incomplete based on state information. If the relevance value is high, then the instruction may be presented regardless of state information.

The location (432), action (434), target (436), target selector (438), pageURL (440), and screenshot Number (442) are the same as the corresponding values in the help file shown in FIG. 4A. In one or more embodiments, the location, action, and target are used to populate the natural language instruction.

Although not shown in FIG. 4B and FIG. 4C, one or more separate column may exist that indicates success and failure conditions and the next node identifier to traverse for the success or failure conditions.

Figure 4D:
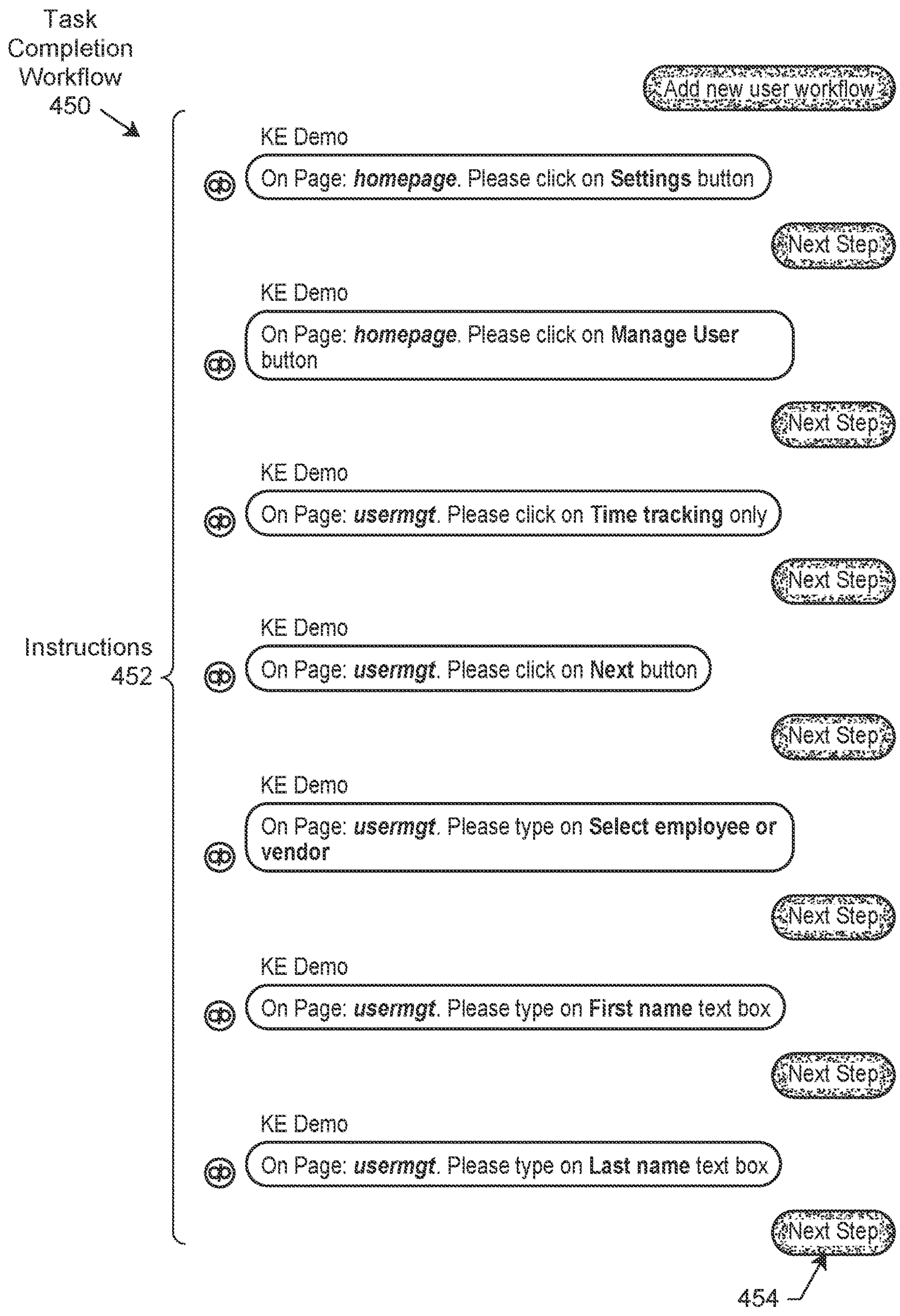

FIG. 4D shows an example of a task completion workflow as presented to the end user in accordance with one or more embodiments. Although FIG. 4D shows a set of instructions, in order to display the instruction, the user selects the GUI widget labeled "next step" (454). In FIG. 4D each instruction is presented in a natural language format that tells the user the page to perform the action and the action to perform. The un-bolded portions of the instruction correspond to the template language selected based on the action type. In the example, "on page < >. Please click on < > button" is a template for the action click and "on page < >. Please type on < > text box" is a template for typing in a text box. The bolded portion of the instructions correspond to step attribute values, such as the page identifier and target.

FIG. 4D is generated using a clickstream file such as shown in FIG. 4A. As shown by a comparison of FIGS. 4A and 4D, one or more embodiments reinterpret clickstream events as steps and transform the steps into natural language instructions. Therefore, while a human user that needs help performing actions cannot interpret the clickstream data, the human user may be able to perform the steps of FIG. 4D. By performing the transformation, one or more embodiments create a technique to use clickstream data to generate an interactive help interface for a particular task.

Figure 5A:
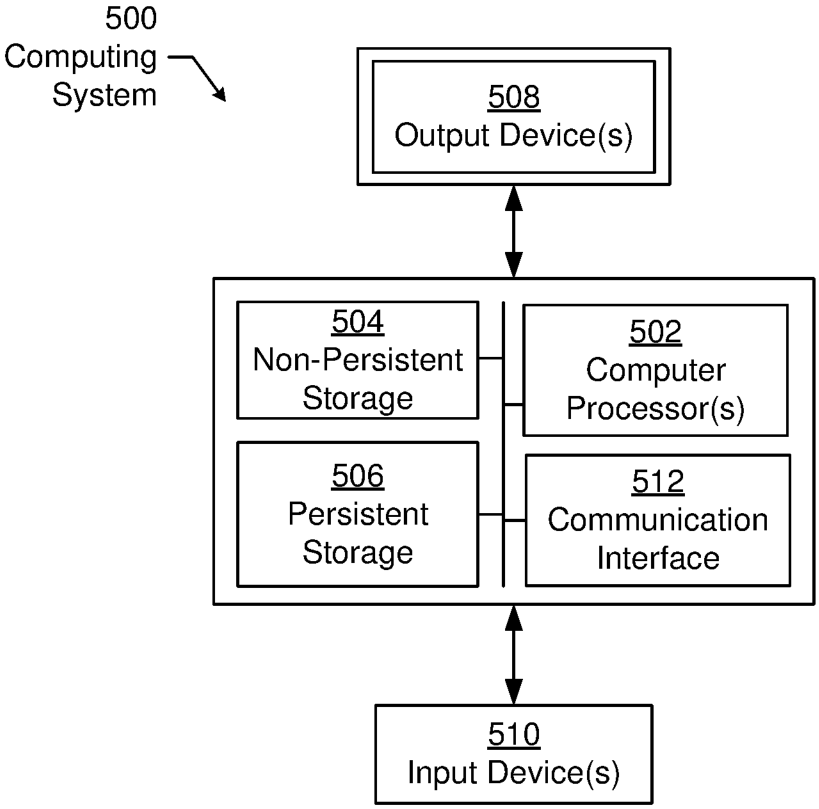
FIGS. 5A and 5B show a computing system in accordance with one or more embodiments of the invention.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, or physical memory. Specifically, the software instructions may correspond to computer readable program code that, when executed by a processor(s), is configured to perform one or more embodiments of the invention.

Figure 5B:
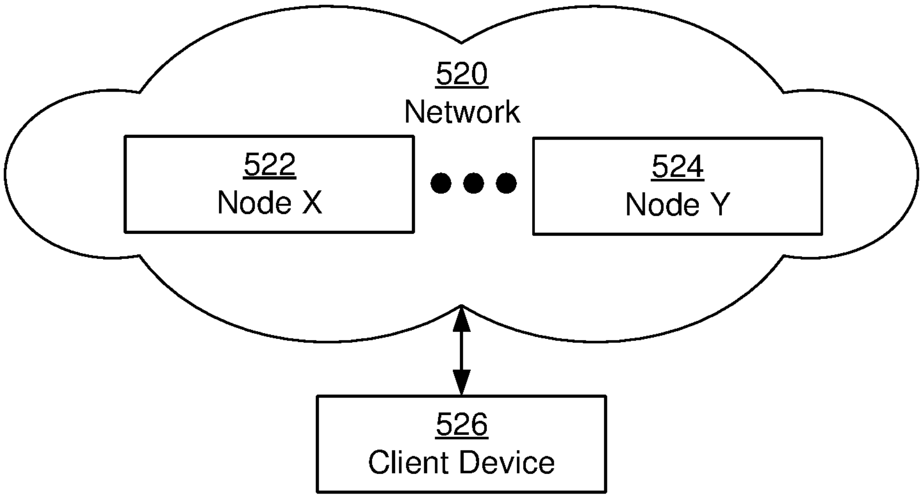

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a GUI on the user device. Data may be submitted via the GUI by a user selecting one or more GUI widgets or inserting text and other data into GUI widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a GUI provided by a computing device. The GUI may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:

generating, by recording clickstream data of a first user, a first clickstream file comprising a first sequence of steps for a first task, wherein at least two steps of the first sequence of steps each comprise a plurality of attributes of the corresponding step of the at least two steps, the plurality of attributes comprising an action, a first parameter comprising a current page, a second parameter comprising a target widget for performing the action, wherein the current page for a first step of the at least two steps is different from the current page of a second step of the at least two steps;

generating, from the first clickstream file, a first knowledge graph comprising a first plurality of instructions corresponding to the first sequence of steps, wherein for at least one instruction of the first plurality of instructions, generating the first knowledge graph adds the action, the first parameter comprising the current page, the second parameter comprising the target widget to a natural language form of the instruction;

extracting, from a first user input of a second user, a first intent to complete the first task;

responsive to extracting the first intent to complete the first task, obtaining the first knowledge graph; and presenting, using the first knowledge graph and to the second user, a first instruction of the first plurality of instructions to perform a first action in a workflow to complete the first task.

2. The method of claim 1, further comprising:

receiving an indication that the second user has performed the first action; and responsive to receiving the indication that the second user has performed the first action, traversing, in the first knowledge graph, a next node of the first knowledge graph having a second instruction.

3. The method of claim 2, further comprising:

determining, using the first knowledge graph, that the first task is incomplete; and presenting, using the first knowledge graph, the second instruction of the first plurality of instructions to perform a second action in the workflow to complete the first task.

4. The method of claim 2, further comprising:

determining, using the first knowledge graph, that the first task is complete; and presenting a message to the second user indicating that the first task is complete.

5. The method of claim 1, wherein the first sequence of steps comprises a plurality of step metadata, the method further comprising:

embedding, in the first plurality of instructions, the plurality of step metadata.

6. The method of claim 1, further comprising:

obtaining a second clickstream file comprising a second plurality of steps for a second task;

generating a second knowledge graph comprising a second plurality of instructions corresponding to the second plurality of steps;

extracting, from a second user input of the second user, a second intent to complete the second task;

responsive to identifying the second intent to complete the second task, retrieving the second knowledge graph; and presenting, using the second knowledge graph, a second instruction of the second plurality of instructions to perform a second action in a workflow to complete the second task.

7. The method of claim 1, wherein the first clickstream file corresponds to task metadata, and wherein extracting the first intent comprises:

determining that the first intent matches the task metadata.

8. A system comprising:

a repository configured to store:

a first clickstream file of a first user comprising a first sequence of steps for a first task, wherein at least two steps of the first sequence of steps each comprise a plurality of attributes of the corresponding step of the at least two steps, the plurality of attributes comprising an action, a first parameter comprising a current page, a second parameter comprising a target widget for performing the action, and wherein the first clickstream file is generated by recording clickstream data, wherein the current page for a first step of the at least two steps is different from the current page of a second step of the at least two steps, and a first knowledge graph comprising a first plurality of instructions corresponding to the first sequence of steps;

a computer processor;

a knowledge graph generator executing on the computer processor configured to:

generate the first knowledge graph from the first clickstream file, wherein for at least one instruction of the first plurality of instructions, generating the first knowledge graph adds the action, the first parameter comprising the current page, the second parameter comprising the target widget to a natural language form of the instruction; and a task completion manager executing on the computer processor configured to:

extract, from a first user input of a second user, a first intent to complete the first task, responsive to extracting the first intent to complete the first task, obtain the first knowledge graph, and present, using the first knowledge graph and to the second user, a first instruction of the first plurality of instructions to perform a first action in a workflow to complete the first task.

9. The system of claim 8, wherein the task completion manager is further configured to:

receive an indication that the second user has performed the first action; and responsive to receiving the indication that the second user has performed the first action, traversing, in the first knowledge graph, a next node of the first knowledge graph having a second instruction.

10. The system of claim 9, wherein the task completion manager is further configured to:

determine, using the first knowledge graph, that the first task is incomplete; and present, using the first knowledge graph, the second instruction of the first plurality of instructions to perform a second action in the workflow to complete the first task.

11. The system of claim 9, wherein the task completion manager is further configured to:

determine, using the first knowledge graph, that the first task is complete; and present a message to the second user indicating that the first task is complete.

12. The system of claim 8, wherein the first sequence of steps comprises a plurality of step metadata, and wherein the task completion manager is further configured to:

embed, in the first plurality of instructions, the plurality of step metadata.

13. The system of claim 8, wherein the task completion manager is further configured to:

obtain a second clickstream file comprising a second plurality of steps for a second task;

generate a second knowledge graph comprising a second plurality of instructions corresponding to the second plurality of steps;

extract, from a second user input of the second user, a second intent to complete the second task;

responsive to identifying the second intent to complete the second task, obtain the second knowledge graph; and present, using the second knowledge graph, a second instruction of the second plurality of instructions to perform a second action in a workflow to complete the second task.

14. The system of claim 8, wherein the first clickstream file corresponds to task metadata, and wherein the task completion manager is further configured to extract the first intent by:

determining that the first intent matches the task metadata.

15. A non-transitory computer readable medium comprising computer readable program code to perform operations, the operations comprising:

generating, by recording clickstream data of a first user, a first clickstream file comprising a first sequence of steps for a first task, wherein at least two steps the first sequence of steps each comprise a plurality of attributes of the corresponding step of the at least two steps, the plurality of attributes comprising an action, a first parameter comprising a current page, a second parameter comprising a target widget for performing the action, wherein the current page for a first step of the at least two steps is different from the current page of a second step of the at least two steps;

generating, from the first clickstream file, a first knowledge graph comprising a first plurality of instructions corresponding to the first sequence of steps, wherein for at least one instruction of the first plurality of instructions, generating the first knowledge graph adds the action, the first parameter comprising the current page, the second parameter comprising the target widget to a natural language form of the instruction;

extracting, from a first user input of a second user, a first intent to complete the first task;

responsive to extracting the first intent to complete the first task, obtaining the first knowledge graph; and presenting, using the first knowledge graph and to the second user, a first instruction of the first plurality of instructions to perform a first action in a workflow to complete the first task.

16. The non-transitory computer readable medium of claim 15, the operations further comprising:

receiving an indication that the second user has performed the first action; and responsive to receiving the indication that the second user has performed the first action, traversing, in the first knowledge graph, a next node of the first knowledge graph having a second instruction.

17. The non-transitory computer readable medium of claim 16, further comprising:

determining, using the first knowledge graph, that the first task is incomplete; and presenting, using the first knowledge graph, the second instruction of the first plurality of instructions to perform a second action in the workflow to complete the first task.

18. The non-transitory computer readable medium of claim 16, the operations further comprising:

determining, using the first knowledge graph, that the first task is complete; and presenting a message to the second user indicating that the first task is complete.

19. The non-transitory computer readable medium of claim 15, wherein the first sequence of steps comprises a plurality of step metadata, the operations further comprising:

embedding, in the first plurality of instructions, the plurality of step metadata.

20. The non-transitory computer readable medium of claim 15, the operations further comprising:

obtaining a second clickstream file comprising a second plurality of steps for a second task;

generating a second knowledge graph comprising a second plurality of instructions corresponding to the second plurality of steps;

extracting, from a second user input of the second user, a second intent to complete the second task;

responsive to identifying the second intent to complete the second task, retrieving the second knowledge graph; and presenting, using the second knowledge graph, a second instruction of the second plurality of instructions to perform a second action in a workflow to complete the second task.

* * * * *